S. D. MOTT.
AIRMAN'S LIFE PRESERVER.
APPLICATION FILED NOV. 23, 1918.

1,337,788.

Patented Apr. 20, 1920.
2 SHEETS—SHEET 1.

INVENTOR
Samuel Dimmick Mott
BY
Townsend Decker
ATTORNEYS

S. D. MOTT.
AIRMAN'S LIFE PRESERVER.
APPLICATION FILED NOV. 23, 1918.

1,337,788.

Patented Apr. 20, 1920.
2 SHEETS—SHEET 2.

INVENTOR
Samuel Dimmick Mott
BY
Townsend & Decker
ATTORNEYS

UNITED STATES PATENT OFFICE.

SAMUEL DIMMICK MOTT, OF PASSAIC, NEW JERSEY.

AIRMAN'S LIFE-PRESERVER.

1,337,788. Specification of Letters Patent. Patented Apr. 20, 1920.

Application filed November 23, 1918. Serial No. 263,810.

*To all whom it may concern:*

Be it known that I, SAMUEL DIMMICK MOTT, a citizen of the United States, and a resident of Passaic, in the county of Passaic and State of New Jersey, have invented a certain new and useful Airman's Life-Preserver, of which the following is a specification.

My invention relates to parachutes for use in connection with aeroplanes, balloons or other aircraft.

The objects of my invention are to provide means for insuring the opening of the parachute by positively unfolding the same, to which end my invention consists essentially in the use of a flexible tube which is folded up with the fabric portion of the parachute in zigzag or accordion fold and the provision, in connection with said tube, of a reservoir or source of air or gas under pressure adapted, by means of a valve or other means, to discharge air or gas under pressure into said tube or tubes, thereby causing the same to straighten out and to expand or unfold the fabric part.

The more general objects of my invention are to provide a parachute that shall be instantly available, shall be promptly automatic when grasped and set for action and shall make it possible for the pilots or passengers of destroyed or disabled craft to be individually freed from the machine and to drop separated therefrom.

When the invention is employed with aeroplanes or flying machines having a clear space above the aviator or passenger, it may be used to quickly and effectively free the user from a falling machine by acting practically to lift him out of the same. For instance, it could be used for such purpose readily with some monoplane types of flying machine as well as with those in which the design is such that the pilot and passengers are well forward on the supporting planes and hence unhampered for prompt action. When the aviators are located between the supporting surfaces or planes as in some biplanes, as also triplanes, a vacant space may be left above their heads through which the aviator may be set free from the machine by the action of the parachute when the fabric portion of the latter is expanded to retard his drop speed relatively to that of the falling machine.

In the accompanying drawings, Figure 1 is a general plan of the fabric portion of the parachute equipped with flexible air or gas tubes according to one arrangement that may be employed for carrying out the invention.

Figure 1:
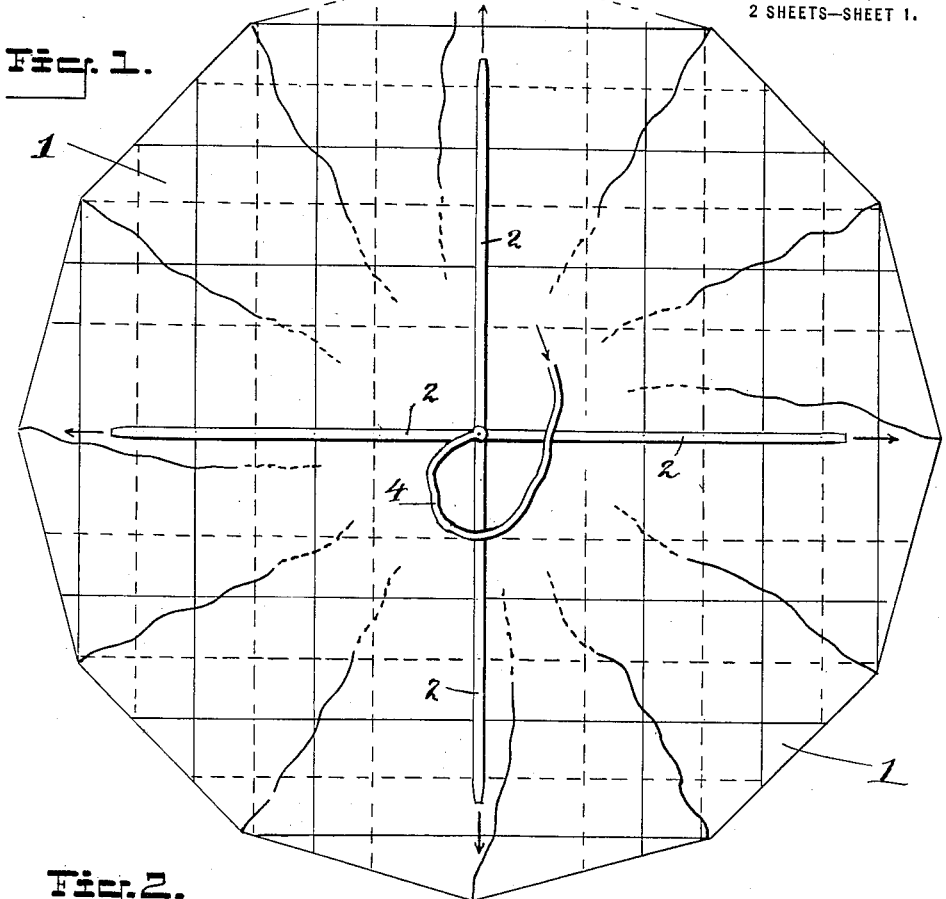
Figure 2:
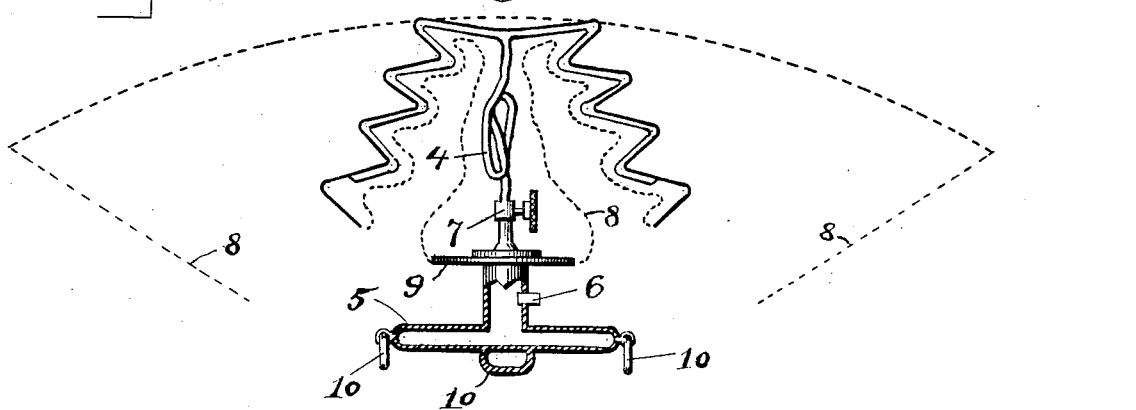
Fig. 2 illustrates the action of the device in expanding the fabric part at the beginning of the action under the influence of the air or gas under pressure in the expanding tubes.
Figure 3:
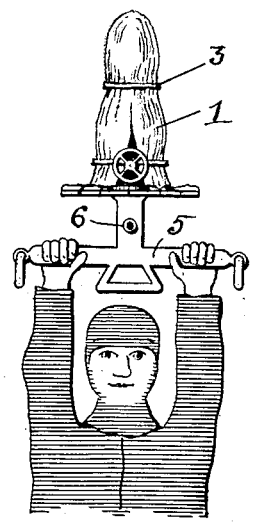
Fig. 3 shows the parachute as folded and in position ready for action to sustain the aviator as soon as it is expanded.
Figure 4:
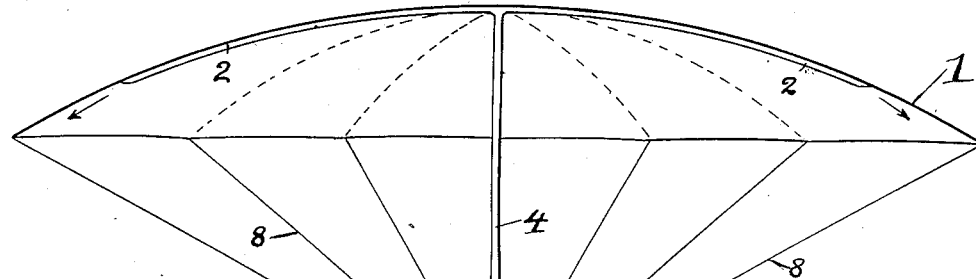
Fig. 4 shows the parachute in action.

1 indicates the fabric portion of the parachute made of any suitable material and 2 the air or gas tube incorporated or folded up with the parachute and adapted to act for the purpose of expanding or unfolding the parachute. The folds of the fabric and tube lying therein are, as shown, of zigzag or bellows form or fashion, the folding being conducted as indicated by the cross lines from the edge toward the center. The folding of the various sectors or segments is done in succession around the periphery or any other desired way, although it is preferable to fold as many sectors as there are tubes 2 employed and in a manner such that the length of the tubes shall be transverse to the plane of the folding, as for instance, with four tubes radiating from the center and having an included angle between them of 90° it would be best to fold the parachute in quadrants. With a greater number of tubes radiating from the center the folding would be in a correspondingly larger number of segments inwardly toward the center. Preferably, after folding, the fabric is wrapped or made up into a bundle as indicated in Fig. 3 and lightly secured by bands 3 which will not interfere materially with the expanding action.

4 indicates a connecting tube for supplying the air or gas under pressure to the tubes 2. Tube 4, also preferably flexible, in the preferred form of my invention, is connected as shown, to a suitable reservoir 5 containing air or gas under pressure. Said reservoir may be filled through an inlet 6. 7 indicates a stop cock or valve which may be open to allow the gas to escape freely from the reservoir 5 and passed through the tube 4 connected to an outlet of the reservoir, into the expanding tubes 2. Said tubes 2 preferably are open wholly or partially at their extremities to allow partial escape of the air or gas under pressure. The effect of the air in the tubes is to straighten said tubes and thereby expand the parachute or unfold it so that it will oppose the fall of the body sustained from the edges thereof by the usual sustaining cords 8. The latter may, for convenience, be connected to the reservoir 5 or part carried thereby, as for instance to the edges of a plate 9 on top of said reservoir as indicated, thus permitting the parachute fabric, the cords and the tubes to be compactly folded without including the reservoir and so that the weight of the reservoir and the hand-hold will be sustained in the usual way by said cords when the parachute opens.

Preferably the parachute is provided with means such as links 10 for attachment of straps or cords of a sustaining harness or jacket to be worn by the aviator. Also the transverse portion of the reservoir is preferably constructed or formed to permit it to be used as a hand-hold in the manner indicated in Fig. 3, so that when desired the aviator may raise the device to the position shown so that when the parachute expands it will operate to lift him, as it were, out of the falling machine.

Figure 5:
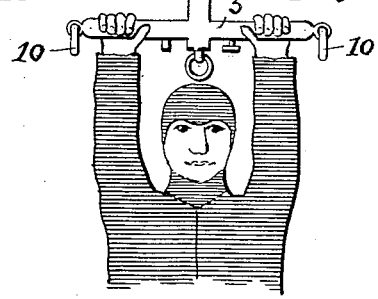
Fig. 5 illustrates in vertical section an air or gas reservoir and the preferred arrangement of button or releasing mechanism for opening the passageway between the same and the expanding tube.
Figure 5:
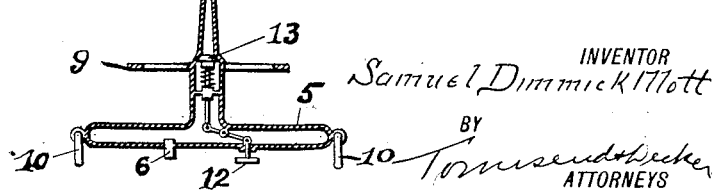

The release of the air or gas under pressure, to expand the parachute is conveniently effected by the use of a push-button 12 such as indicated in Fig. 5, said push-button being located conveniently to the hand of the operator when grasping the cross-bar 5 of the reservoir and being connected through suitable devices with the valve 13. Said valve 13 is normally seated by a spring and the contained air pressure to prevent escape of the air or gas from the reservoir into the tube 4 but by pressing upon the button 12, the valve 13 may be opened and thus allow free exit of the air or gas from the reservoir into the expanding tubes 2.

I do not limit myself, however, to this special mechanism and any means which will allow a prompt or free escape of air or gas into the tubes 2 may be employed.

Also, as will be readily understood, my invention is not confined to any particular means for setting up a pressure in the tubes 2.

It will be readily understood that any suitable air or gas tight material may be employed for the tubes 2, said material being of such character as to permit the folding up of the tubes in the folded fabric; also that said tube may be suitably attached to the fabric portion of the parachute or secured in position thereon to prevent them from becoming displaced.

Obviously the tubes may be separate tubes either of rubber or rubberized fabric and preferably of such thickness as to be readily collapsible when folded up with the parachute or they may be incorporated by cementing the edges of narrow rubber or rubberized strips to the fabric of the parachute, the portion between edges being left free to form, in coöperation with the included surface of the parachute, a duct collapsible in folding but adapted to expand and straighten out by the action of the air or gas admitted to it under pressure.

What I claim as my invention is:

1. A parachute having expanding air or gas containing tubes attached to the fabric portion thereof and folded into said fabric portion with each segment or sector of the fabric and tube lying therein folded in zigzag or bellows form toward the center combined with means for supporting the parachute so that it shall be free to expand both outwardly and upwardly, and means for producing pressure of air or gas in said tubes.

2. The combination with a parachute having expanding flexible tubes folded up with it, an air or gas reservoir forming a hand-hold, connections from said tube to said reservoir and means accessible to the hand while the aviator is sustained by the hand-hold for opening the connection between the reservoir and tubes at will as and for the purpose described.

3. The combination with a parachute having expanding tubes folded up with it, of a reservoir containing air or gas under pressure and having transverse portions or arms forming a hand-hold and means upon the hand-hold accessible to the hand of the aviator for opening a passage between the reservoir and said tubes.

4. The combination with a parachute provided with expanding flexible tubes, of a hand-hold and push-button upon said hand-hold for producing at will pressure of air or gas in said tubes.

5. A parachute having flexible tubes folded up with it, a reservoir connected with said tubes and forming a hand-hold, parachute sustaining cords sustaining the reservoir and hand-hold from the top thereof to allow the fabric and cords to be folded up together without including the reservoir, an interposed valve and means upon the hand-hold for opening said valve.

Signed at New York, in the county of New York and State of New York, this 20th day of November, A. D. 1918.

SAMUEL DIMMICK MOTT.

Witnesses:
 IRENE LEFKOWITZ,
 C. F. TISCHNER,